US012612071B2

(12) United States Patent
Kawashima

(10) Patent No.: US 12,612,071 B2
(45) Date of Patent: Apr. 28, 2026

(54) AUTONOMOUS DRIVING VEHICLE

(71) Applicant: TOYOTA JIDOSHA KABUSHIKI KAISHA, Toyota (JP)

(72) Inventor: Wataru Kawashima, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/806,975

(22) Filed: Aug. 16, 2024

(65) Prior Publication Data

US 2025/0074457 A1 Mar. 6, 2025

(30) Foreign Application Priority Data

Sep. 4, 2023 (JP) ................................. 2023-143159

(51) Int. Cl.
*B60W 60/00* (2020.01)
*G06V 20/58* (2022.01)

(52) U.S. Cl.
CPC ......... *B60W 60/001* (2020.02); *G06V 20/584* (2022.01); *B60W 2720/106* (2013.01)

(58) Field of Classification Search
None
See application file for complete search history.

(56) References Cited

U.S. PATENT DOCUMENTS

2020/0255005 A1* 8/2020 Matsunaga ....... B60W 50/0097

FOREIGN PATENT DOCUMENTS

| CN | 115547045 A | * | 12/2022 | ............... G08G 1/04 |
|----|-------------|---|---------|---------|
| EP | 3725630 A1 | * | 10/2020 | ............. G06V 20/58 |
| JP | 2001-052297 A | | 2/2001 | |
| JP | 2005-165643 A | | 6/2005 | |
| JP | 2010097345 A | * | 4/2010 | |
| JP | 2019074885 A | * | 5/2019 | |
| JP | 6817413 B | | 1/2021 | |
| JP | 2021104728 A | * | 7/2021 | |
| WO | WO-2018211708 A1 | * | 11/2018 | ...... B60W 60/00274 |
| WO | WO-2023037593 A1 | * | 3/2023 | ............. B60W 30/16 |

* cited by examiner

*Primary Examiner* — Justin S Lee

(74) *Attorney, Agent, or Firm* — Dickinson Wright, PLLC

(57) ABSTRACT

An autonomous driving vehicle includes an ECU configured to, when a lighting state is green lighting and a state has changed from a state where a host vehicle cannot pass an intersection to a state where the host vehicle can pass the intersection: cause the host vehicle that has stopped in front of the intersection to start moving and cause the host vehicle to travel with an acceleration or a vehicle speed limited to a second upper limit value smaller than a first upper limit value when there is a crossing oncoming vehicle; and cause the host vehicle to travel with the acceleration or the vehicle speed limited to a third upper limit value smaller than the second upper limit value when the crossing oncoming vehicle is a two-wheeled vehicle, the second upper limit value being used when the crossing oncoming vehicle is not a two-wheeled vehicle.

5 Claims, 3 Drawing Sheets

AUTONOMOUS DRIVING VEHICLE

CROSS-REFERENCE TO RELATED APPLICATION

This application claims the benefit of priority from Japanese Patent Application No. 2023-143159, filed on Sep. 4, 2023, the entire contents of which are incorporated herein by reference.

TECHNICAL FIELD

The present disclosure relates to an autonomous driving vehicle.

BACKGROUND

Japanese Patent Application Laid-Open No. 2005-165643 discloses a driving assistance device that determines that a host vehicle cannot pass unless a sufficient space for the host vehicle to enter is generated while the traffic light is green, based on a position and a shape of an intersection and a position and a size of a preceding vehicle.

In the technology of causing a vehicle to stop in front of an intersection according to the traffic condition ahead of the vehicle even with a green light as in the above-described conventional technology, there is room for improvement in order to more safely cause the vehicle to pass through the intersection when the vehicle that has stopped is caused to start moving in front of the intersection.

The present disclosure describes an autonomous driving vehicle capable of traveling at an intersection in further consideration of safety when causing the vehicle that has stopped in front of the intersection to start moving according to a traffic condition ahead of the vehicle when the traffic light is green.

SUMMARY

An autonomous driving vehicle according to one aspect of the present disclosure includes a traffic light state recognition unit configured to recognize a lighting state of a traffic light at an intersection ahead of a host vehicle on an own lane based on a detection result of an in-vehicle external sensor, a space recognition unit configured to recognize a space between a vehicle ahead located beyond the intersection in a straight traveling direction of the host vehicle and the intersection based on the detection result of the external sensor, a passing determination unit configured to determine, based on the space, whether the host vehicle can pass through the intersection, and a vehicle control unit configured to stop the host vehicle in front of the intersection when the lighting state is green lighting and the host vehicle cannot pass through the intersection, wherein the vehicle control unit is configured to, when the lighting state is green lighting and a state has changed from a state where the host vehicle cannot pass the intersection to a state where the host vehicle can pass the intersection, cause the host vehicle that has stopped in front of the intersection to start moving and cause the host vehicle to travel with an acceleration or a vehicle speed of the host vehicle limited to a second upper limit value smaller than a first upper limit value when there is a crossing oncoming vehicle that is about to turn right or left at the intersection in such a manner as to cross the own lane, the first upper limit value being used when there is no crossing oncoming vehicle, and cause the host vehicle to travel with the acceleration or the vehicle speed of the host vehicle limited to a third upper limit value smaller than the second upper limit value when the crossing oncoming vehicle is a two-wheeled vehicle, the second upper limit value being used when the crossing oncoming vehicle is not a two-wheeled vehicle.

In the autonomous driving vehicle according to one aspect of the present disclosure, when the traffic light is green and the state has changed from a state where the host vehicle cannot pass the intersection to a state where the host vehicle can pass the intersection at the intersection ahead of the host vehicle on the own lane, the host vehicle that has stopped in front of the intersection is caused to start moving. At this time, when there is a crossing oncoming vehicle that is about to turn right or left at the intersection in such a manner as to cross the own lane and the crossing oncoming vehicle is a two-wheeled vehicle, the host vehicle is caused to travel with the acceleration or the vehicle speed of the host vehicle limited to the third upper limit value smaller than the second upper limit value that is used when the crossing oncoming vehicle is not a two-wheeled vehicle. As a result, when the crossing oncoming vehicle is a two-wheeled vehicle, the host vehicle travels at the intersection in further consideration of safety as compared to when the crossing oncoming vehicle is not a two-wheeled vehicle. Therefore, when the traffic light is green and a vehicle that has stopped in front of an intersection is caused to start moving according to a traffic condition ahead of the vehicle, it is possible to cause the vehicle to travel at the intersection in further consideration of safety.

In one embodiment, the vehicle control unit may be configured to cause the host vehicle to travel with the acceleration or the vehicle speed of the host vehicle limited to the second upper limit value or the third upper limit value until the host vehicle goes by the crossing oncoming vehicle, and cause the host vehicle to travel with the acceleration or the vehicle speed of the host vehicle limited to the first upper limit value after the host vehicle goes by the crossing oncoming vehicle.

According to the present disclosure, when a vehicle that has stopped in front of an intersection is caused to start moving according to a traffic condition ahead of the vehicle with a green light, it is possible to cause the vehicle to travel at the intersection in further consideration of safety.

DETAILED DESCRIPTION

Figure 1:
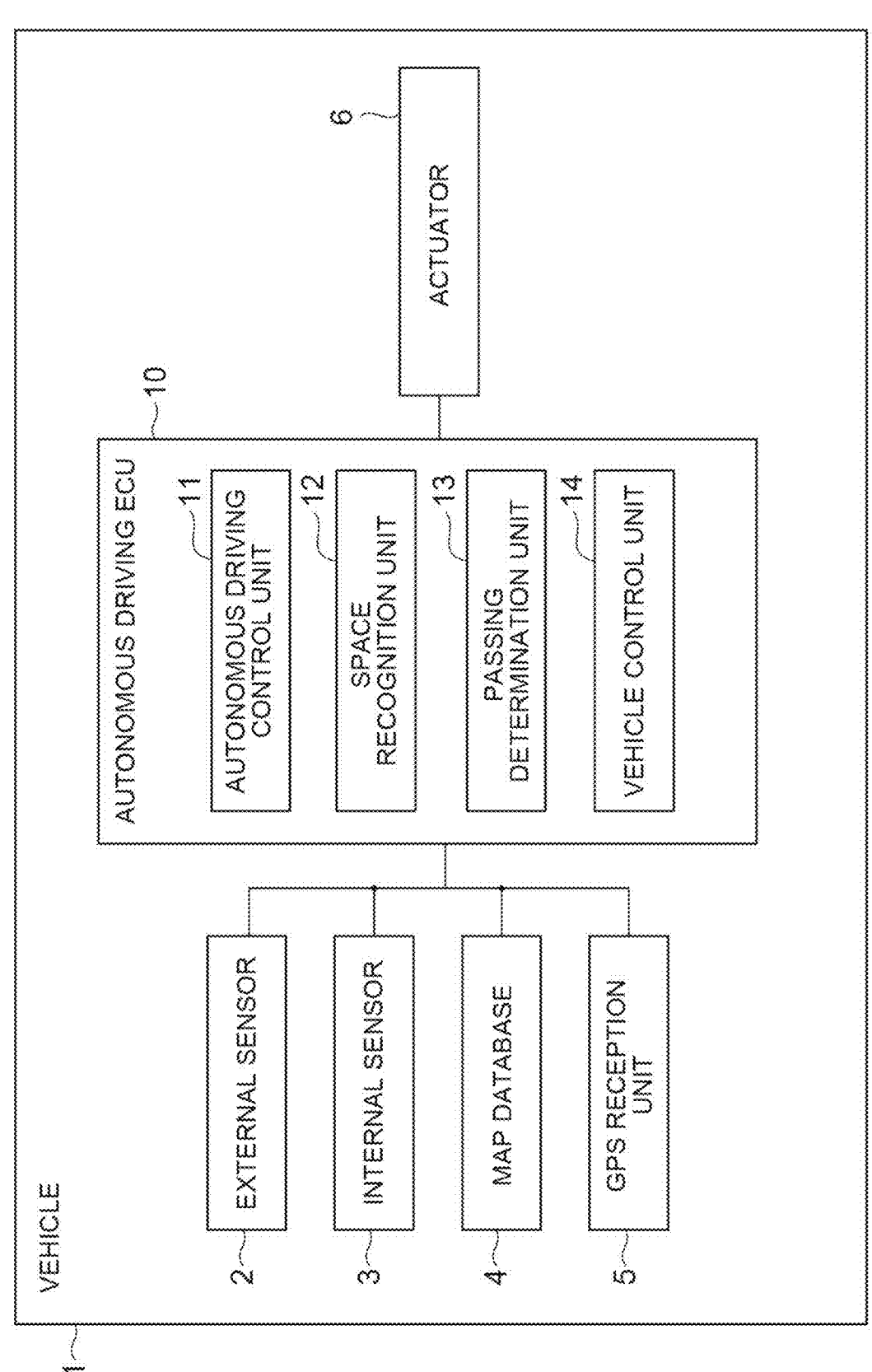
FIG. 1 is a functional block diagram illustrating an autonomous driving vehicle according to an embodiment.

Hereinafter, exemplary embodiments will be described with reference to the drawings. In the following description, the same or corresponding elements are denoted by the same reference numerals, and redundant description may be omitted.

FIG. 1 is a functional block diagram illustrating an autonomous driving vehicle according to an embodiment. As illustrated in FIG. 1, a vehicle (host vehicle) 1 is, for example, a vehicle such as a passenger vehicle. The vehicle 1 is an autonomous driving vehicle including an autonomous driving system. The autonomous driving system causes the vehicle 1 to travel in an autonomous driving state.

The autonomous driving is a driving state in which the vehicle 1 is caused to automatically travel along a road on which the vehicle 1 travels. The autonomous driving includes, for example, a driving state in which the vehicle 1 is caused to automatically travel toward a preset destination without a driver performing a driving operation. The autonomous driving includes, for example, the autonomous driving level 2 to the autonomous driving level 4 of SAE [Society of Automotive Engineers] J3016. The destination may be set by an occupant such as a driver, or may be automatically set by the vehicle 1. The autonomous driving may be vehicle control that causes the vehicle 1 to automatically travel along a road without setting a destination. In the autonomous driving, the driver does not need to perform a driving operation, and the vehicle 1 automatically travels. Here, the autonomous driving includes causing the vehicle 1 to automatically stop in front of an intersection according to a traffic condition ahead of the intersection even if the traffic light is green at the intersection ahead of the host vehicle on the own lane, which is a lane on which the vehicle 1 travels.

The vehicle 1 includes an external sensor 2, an internal sensor 3, a map database 4, a GPS receiving unit 5, an actuator 6, and an autonomous driving electronic control unit (ECU) 10.

The external sensor 2 is a detection device that detects a situation around the vehicle 1 (external environment of the vehicle). The external sensor 2 includes a camera that captures at least an image in front of the vehicle 1. The external sensor 2 may include a radar sensor. The external sensor 2 may be configured to be able to reconstruct various properties (position of the vehicle, relative distance to other vehicles, relative speed with other vehicles, direction of other vehicles, shape of the lane, lighting state of the traffic light, etc.) of the external environment of the vehicle 1 where the vehicle 1 travels.

The camera is an imaging device that captures an image of the external environment of the vehicle 1. The camera is provided on the back side of the windshield of the vehicle 1. The camera transmits imaging information on the external environment of the vehicle 1 to the autonomous driving ECU 10. The camera may be a monocular camera or a stereo camera. The stereo camera includes two imaging units disposed to reproduce binocular parallax. The imaging information of the stereo camera also includes information in a depth direction.

The radar sensor is a detection device that detects an object around the vehicle 1 using radio waves (for example, millimeter waves) or light. The radar sensor includes, for example, millimeter wave radar or Light Detection And Ranging (LiDAR). The radar sensor transmits radio waves or light to the periphery of the vehicle 1 and receives radio waves or light reflected from an object to detect the object. The radar sensor transmits the detected object information to the autonomous driving ECU 10.

The internal sensor 3 is a detection device that detects a traveling state of the vehicle 1. The internal sensor 3 includes a vehicle speed sensor. The vehicle speed sensor is a detector that detects a speed of the vehicle 1. For example, a known wheel speed sensor may be used as the vehicle speed sensor. The vehicle speed sensor transmits the detected vehicle speed information to the autonomous driving ECU 10.

The internal sensor 3 may include a known acceleration sensor and a known yaw rate sensor. The acceleration sensor is a detector that detects an acceleration of the vehicle 1. The acceleration sensor transmits acceleration information of the vehicle 1 to the autonomous driving ECU 10. The yaw rate sensor is a detector (for example, a gyro sensor) that detects a yaw rate (rotation angular velocity) around a vertical axis of a center of gravity of the vehicle 1. The yaw rate sensor transmits the detected yaw rate information of the vehicle to the autonomous driving ECU 10.

The map database 4 is a storage device that stores map information. The map database 4 is provided, for example, in a storage medium such as a hard disk drive (HDD) mounted on the vehicle 1. The map information includes information on positions and shapes of roads, intersections, and crossroads (for example, a position and a shape of an intersection, a width of a lane, and a position of a dividing line and a crosswalk). The map information may also include structure information (such as a position and a type of a traffic light provided at an intersection) and various types of traffic rule information (information on one-way roads, no turns, no U-turns, etc.). Part of the map information included in the map database 4 may be stored in a storage device different from the HDD or the like. The map database 4 may be formed in a computer of a facility such as a management center that can communicate with the vehicle 1.

The GPS receiving unit 5 receives signals from three or more GPS satellites and acquires position information indicating the position of the vehicle 1. The position information includes, for example, the latitude and longitude. Instead of the GPS receiving unit 5, other means that can specify the latitude and longitude of the vehicle 1 may be used.

The actuator 6 is a device used for controlling the autonomous driving of the vehicle 1. The actuator 6 includes at least a drive actuator, a brake actuator, and a steering actuator. The drive actuator controls a supply amount (throttle opening) of air to the engine in response to a control signal from the autonomous driving ECU 10 to control a driving force of the vehicle 1, for example. When the vehicle 1 is a hybrid vehicle, a control signal from the autonomous driving ECU 10 is input to a motor as a power source in addition to the supply amount of air to the engine, and the driving force is controlled. When the vehicle 1 is an electric vehicle, a control signal from the autonomous driving ECU 10 is input to the motor as a power source to control the driving force. The motor as a power source in these cases constitutes the actuator 6.

The brake actuator controls a brake system in response to a control signal from the autonomous driving ECU 10 to control a braking force to be applied to wheels of the vehicle 1. As the brake system, for example, a hydraulic brake system may be used. The steering actuator controls driving of an assist motor that controls a steering torque in an electric power steering system in response to a control signal from the autonomous driving ECU 10. As a result, the steering actuator controls the steering torque in response to the control signal from the autonomous driving ECU 10.

The autonomous driving ECU 10 is a main component of the autonomous driving system. The autonomous driving ECU 10 executes the autonomous driving control of the vehicle 1. The autonomous driving ECU 10 is an electronic control unit including a central processing unit (CPU), a read only memory (ROM), a random access memory (RAM), and a controller area network (CAN) communication circuit. The autonomous driving ECU 10 is connected to a network that communicates using, for example, a CAN communication circuit, and is communicably connected to the above-described components of the vehicle 1. For example, based on a signal output from the CPU, the autonomous driving ECU 10 operates the CAN communication circuit to input and output data, stores the data in the RAM, loads a program stored in the ROM into the RAM, and executes the program loaded in the RAM with the CPU, thereby implementing an autonomous driving function. The autonomous driving ECU 10 may include a plurality of electronic units.

Next, an example of a functional configuration of the autonomous driving ECU 10 will be described. The autonomous driving ECU 10 includes an autonomous driving control unit 11, a space recognition unit 12, a passing determination unit 13, and a vehicle control unit 14.

The autonomous driving control unit 11 recognizes the external environment of the vehicle 1 based on the detection result of the external sensor 2 (the image captured by the camera or the object information detected by the radar sensor). The external environment includes a relative position of a surrounding object with respect to the vehicle 1. The external environment may include a relative speed and a moving direction of a surrounding object with respect to the vehicle 1. The autonomous driving control unit 11 recognizes objects such as other vehicles and traffic lights through pattern matching or the like. The other vehicle includes a vehicle ahead located beyond an intersection in a straight traveling direction of the vehicle 1. The autonomous driving control unit 11 functions as a traffic light state recognition unit that recognizes a lighting state of a traffic light at the intersection ahead of the host vehicle on the own lane based on a detection result of the external sensor 2 mounted on the vehicle. In the following description, the "lighting state of a traffic light at the intersection ahead of the host vehicle on the own lane" may be simply referred to as "lighting state of the traffic light".

The autonomous driving control unit 11 recognizes the traveling state of the vehicle 1 based on the detection result of the internal sensor 3. The traveling state includes, for example, a vehicle speed of the vehicle 1, an acceleration of the vehicle 1, and a yaw rate of the vehicle 1. For example, the autonomous driving control unit 11 acquires a road environment (for example, a road shape, an intersection shape, and a signal type) around the vehicle 1 based on map information.

For example, the autonomous driving control unit 11 acquires the current vehicle position of the vehicle 1 based on the position information from the GPS receiving unit 5. The autonomous driving control unit 11 may acquire the current vehicle position of the vehicle 1 through the SLAM technology. The autonomous driving control unit 11 may acquire the current vehicle position of the vehicle 1 through another known method.

The autonomous driving control unit 11 executes the autonomous driving of the vehicle 1. The autonomous driving control unit 11 generates a course of the vehicle 1 based on, for example, the target route, the position of the vehicle 1, the external environment of the vehicle 1, and the traveling state of the vehicle 1. The course corresponds to a travel plan for autonomous driving. The course includes, for example, a path on which the vehicle travels in the autonomous driving and a vehicle speed plan in the autonomous driving. The path is a trajectory along which the vehicle in autonomous driving is scheduled to travel on the target route instructed by an automatic parking system. The path can be, for example, data of the steering angle and the vehicle speed (steering angle plan and vehicle speed plan) of the vehicle 1 set at predetermined intervals on the target route. The autonomous driving control unit 11 controls the actuator 6 so as to follow the autonomous driving travel plan, and executes the autonomous driving of the vehicle 1.

Based on the detection result of the external sensor 2, the space recognition unit 12 recognizes a space between a vehicle ahead (preceding vehicle) located beyond an intersection in the straight traveling direction of the vehicle 1 and the intersection. In the following description, the "space between a vehicle ahead located beyond an intersection in the straight traveling direction of the vehicle 1 and the intersection" may be simply referred to as "stoppable space". The shape of the intersection may be a cross, a Y shape, or the like, and is not particularly limited. The straight traveling direction in the intersection is not limited to a straight traveling direction at the cross or the like, and may include an along-the-road direction at a Y-shaped road or the like. The stoppable space may be, for example, a distance between a rear end position of the vehicle ahead and an edge of a road sign (an edge closer to the vehicle ahead) forming a crosswalk when the vehicle ahead is located beyond the crosswalk located beyond the intersection in the straight traveling direction.

The passing determination unit 13 determines whether the vehicle 1 can pass through the intersection based on the stoppable space. "The vehicle 1 can pass through the intersection" means that the vehicle 1 can complete passing beyond the intersection in the straight traveling direction, and the vehicle 1 can stop without physically protruding to the intersection.

For example, when the stoppable space is larger than or equal to a length threshold which is a length obtained by adding a predetermined margin distance to the longitudinal length of the vehicle 1, the passing determination unit 13 determines that the vehicle 1 can pass through the intersection. When the stoppable space is smaller than the length threshold, the passing determination unit 13 determines that the vehicle 1 cannot pass through the intersection. For example, when it has been determined that the vehicle 1 cannot pass through the intersection because the stoppable space is smaller than the length threshold, the passing determination unit 13 determines that the vehicle 1 can pass through the intersection when the vehicle ahead moves forward and the stoppable space becomes larger than or equal to the length threshold.

When the traffic light is green and the vehicle 1 cannot pass through the intersection, the vehicle control unit 14 stops the vehicle 1 in front of the intersection. When the traffic light is green and the state has changed from a state where the vehicle 1 cannot pass the intersection to a state where the vehicle 1 can pass the intersection, the vehicle control unit 14 causes the vehicle 1 that has stopped in front of the intersection to start moving.

The vehicle control unit 14 recognizes a crossing oncoming vehicle by a known method based on, for example, imaging information of a camera of the external sensor 2. The crossing oncoming vehicle is an oncoming vehicle that is about to turn right or left at the intersection so as to cross the own lane. The crossing oncoming vehicle may be an oncoming vehicle present in a right turn lane or a left turn lane. When there is no right turn lane or left turn lane, the crossing oncoming vehicle may be an oncoming vehicle in an oncoming lane that blinks a blinker in order to travel at the intersection in such a manner as to cross the own lane. The vehicle control unit 14 recognizes the presence or absence of the crossing oncoming vehicle and the type of the crossing oncoming vehicle. The vehicle control unit 14 recognizes at least whether the crossing oncoming vehicle is a two-wheeled vehicle.

When the traffic light is green and the state has changed from a state where the vehicle 1 cannot pass the intersection to a state where the vehicle 1 can pass the intersection, the vehicle control unit 14 limits the acceleration or the vehicle speed of the vehicle 1 to a first upper limit value and causes the vehicle 1 to travel when there is no crossing oncoming vehicle. In the following description, "when the traffic light is green and the state has changed from a state where the vehicle 1 cannot pass the intersection to a state where the vehicle 1 can pass the intersection" may be simply referred to as "when the situation has changed from a state where passing is impossible to a state where passing is possible".

Figure 2:
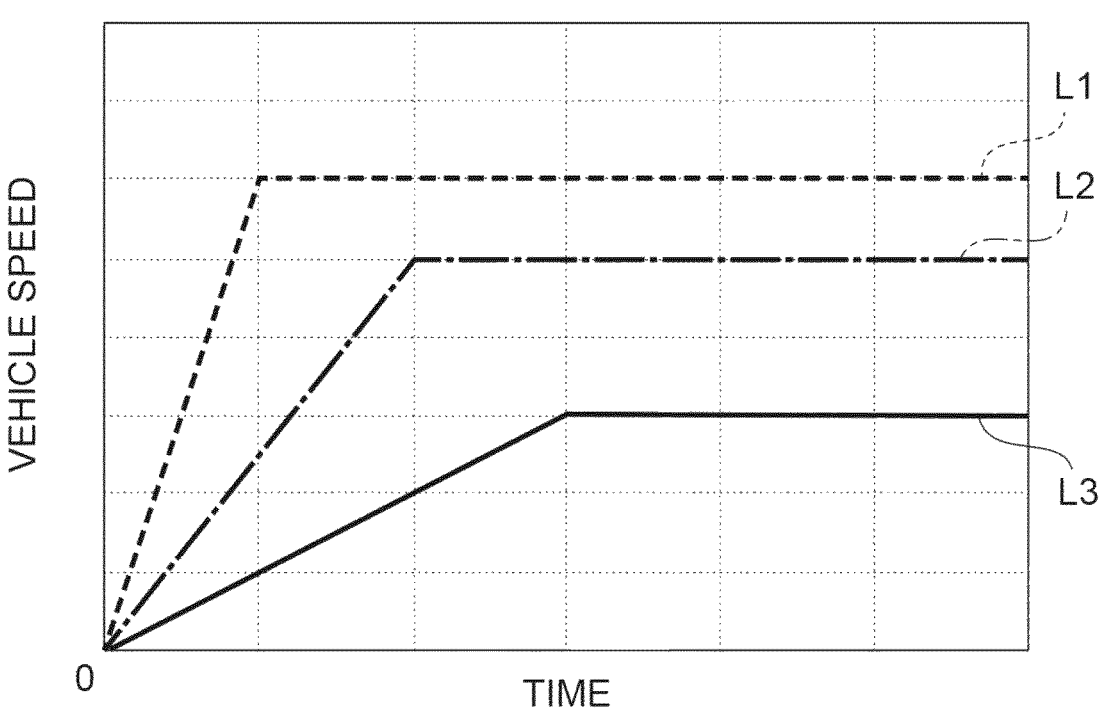
FIG. 2 is a diagram illustrating a vehicle speed of a host vehicle when the host vehicle that has stopped starts moving.

The first upper limit value is a limit value of the acceleration or the vehicle speed of the vehicle 1 used when there is no crossing oncoming vehicle when the situation has changed from a state where passing is impossible to a state where passing is possible. The first upper limit value may be an upper limit value of the acceleration or the vehicle speed of the vehicle 1 in normal autonomous driving corresponding to a situation where there is no crossing oncoming vehicle. FIG. 2 is a diagram illustrating a vehicle speed of the host vehicle when the host vehicle that has stopped starts moving. As illustrated in FIG. 2, for example, until the vehicle speed reaches a first vehicle speed upper limit value (first upper limit value), the vehicle control unit 14 controls the acceleration to be less than or equal to the first acceleration upper limit value (first upper limit value) and causes the vehicle 1 to travel. The first vehicle speed upper limit value corresponds to the horizontal portion of the broken line L1. The first acceleration upper limit value corresponds to the inclined portion of the broken line L1.

When the situation has changed from a state where passing is impossible to a state where passing is possible and there is a crossing oncoming vehicle excluding a two-wheeled vehicle, the vehicle control unit 14 causes the vehicle 1 to travel with the acceleration or the vehicle speed of the vehicle 1 limited to a second upper limit value. That is, when the traffic light is green, the state has changed from a state where the vehicle 1 cannot pass the intersection to a state where the vehicle 1 can pass the intersection, and there is a crossing oncoming vehicle that is about to turn right or left at the intersection in such a manner as to cross the own lane, the vehicle control unit 14 causes the vehicle 1 that has stopped in front of the intersection to start moving and causes the vehicle 1 to travel with the acceleration or the vehicle speed of the vehicle 1 limited to the second upper limit value smaller than the first upper limit value that is used when there is no crossing oncoming vehicle.

The second upper limit value is a limit value of the acceleration or the vehicle speed of the vehicle 1 used when there is a crossing oncoming vehicle excluding a two-wheeled vehicle when the situation has changed from a state where passing is impossible to a state where passing is possible. The second upper limit value may be a value smaller than the upper limit value of the acceleration or the vehicle speed of the vehicle 1 in normal autonomous driving, corresponding to a situation where there is a crossing oncoming vehicle excluding a two-wheeled vehicle. As illustrated in FIG. 2, for example, until the vehicle speed reaches a second vehicle speed upper limit value (second upper limit value), the vehicle control unit 14 sets the acceleration to be less than or equal to the second acceleration upper limit value (second upper limit value) and causes the vehicle 1 to travel. The second vehicle speed upper limit value corresponds to the horizontal portion of the one-dot chain line L2. The second vehicle acceleration upper limit value corresponds to the inclined portion of the one-dot chain line L2.

When the situation has changed from a state where passing is impossible to a state where passing is possible and there is a two-wheeled vehicle as the crossing oncoming vehicle, the vehicle control unit 14 causes the vehicle 1 that has stopped in front of the intersection to start moving and causes the vehicle 1 to travel with the acceleration or the vehicle speed of the vehicle 1 limited to a third upper limit value that is smaller than the second upper limit value. That is, when the crossing oncoming vehicle is a two-wheeled vehicle, the vehicle control unit 14 limits the acceleration or the vehicle speed of the vehicle 1 to the third upper limit value, which is smaller than the second upper limit value that is used when the crossing oncoming vehicle is not a two-wheeled vehicle, and causes the vehicle 1 to travel.

The third upper limit value is a limit value of the acceleration or the vehicle speed of the vehicle 1 used when there is a crossing oncoming vehicle that is a two-wheeled vehicle when the situation has changed from a state where passing is impossible to a state where passing is possible. The third upper limit value may be an upper limit value of the acceleration or the vehicle speed of the vehicle 1 set in further consideration of a tendency that the crossing oncoming vehicle that is a two-wheeled vehicle tends to run into the own lane before going by the vehicle 1, rushing to turn right or left, for example. As illustrated in FIG. 2, for example, until the vehicle speed reaches a third vehicle speed upper limit value (third upper limit value), the vehicle control unit 14 controls the acceleration to be less than or equal to the third acceleration upper limit value (third upper limit value) and causes the vehicle 1 to travel. The third vehicle speed upper limit value corresponds to the horizontal portion of the solid line L3. The third acceleration upper limit value corresponds to the inclined portion of the solid line L3.

The vehicle control unit 14 may determine whether it is before the vehicle 1 goes by the crossing oncoming vehicle based on, for example, a recognition result of the crossing oncoming vehicle. The vehicle control unit 14 may cause the vehicle 1 to travel with the acceleration or the vehicle speed of the vehicle 1 limited to the second upper limit value or the third upper limit value until the vehicle 1 goes by the crossing oncoming vehicle. The vehicle control unit 14 may cause the vehicle 1 to travel with the acceleration or the vehicle speed of the vehicle 1 limited to the first upper limit value after the vehicle 1 goes by the crossing oncoming vehicle.

Figure 3:
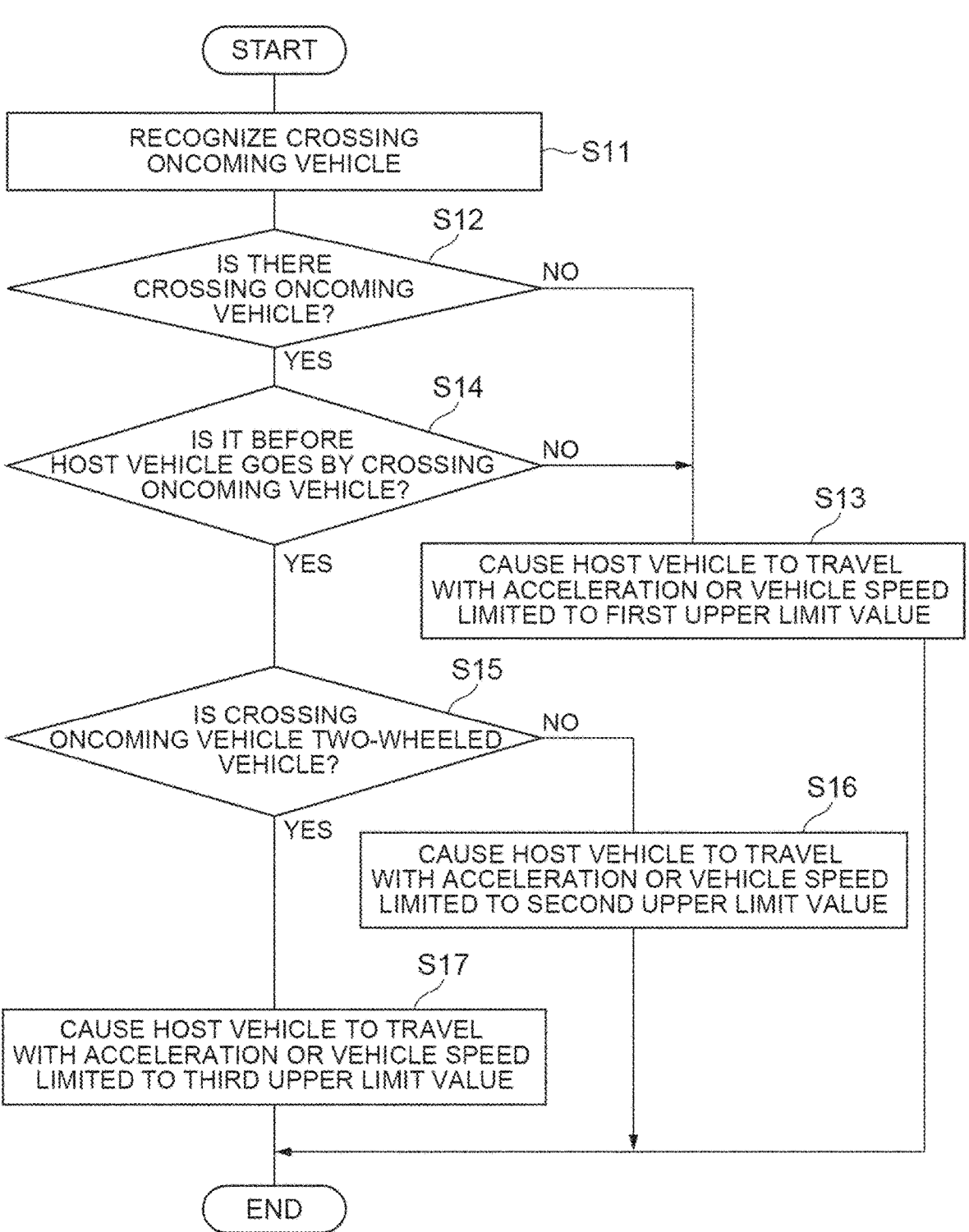
FIG. 3 is a flowchart illustrating an example of processing of an autonomous driving ECU.

Next, processing of the autonomous driving ECU 10 will be described with reference to FIG. 3. FIG. 3 is a flowchart illustrating an example of processing of an autonomous driving ECU. The flowchart illustrated in FIG. 3 is repeatedly executed at predetermined intervals for a period from when the vehicle 1 that has stopped in front of the intersection starts moving until the vehicle 1 finishes passing the intersection, for example when the state has changed from a state where the vehicle 1 cannot pass the intersection to a state where the vehicle can pass the intersection during the autonomous driving of the vehicle 1.

As illustrated in FIG. 3, the autonomous driving ECU 10, as S11, causes the vehicle control unit 14 to recognize a crossing oncoming vehicle. The vehicle control unit 14 recognizes a crossing oncoming vehicle by a known method based on, for example, imaging information of a camera of the external sensor 2.

In S12, the autonomous driving ECU 10 causes the vehicle control unit 14 to determine whether there is a crossing oncoming vehicle. The vehicle control unit 14 determines whether there is a crossing oncoming vehicle based on, for example, a recognition result of the crossing oncoming vehicle.

When it is determined that there is no crossing oncoming vehicle (S12: NO), the autonomous driving ECU 10 proceeds to the processing of S13. In S13, the autonomous driving ECU 10 causes the vehicle 1 to travel with the acceleration or the vehicle speed limited to the first upper limit value with the vehicle control unit 14. For example, until the vehicle speed reaches the first vehicle speed upper limit value (first upper limit value), the vehicle control unit 14 sets the acceleration to be less than or equal to the first acceleration upper limit value (first upper limit value) and causes the vehicle 1 to travel. Thereafter, the autonomous driving ECU 10 ends the processing of FIG. 3.

On the other hand, when it is determined that there is a crossing oncoming vehicle (S12: YES), the autonomous driving ECU 10 proceeds to the processing of S14.

In S14, the autonomous driving ECU 10 causes the vehicle control unit 14 to determine whether it is before the vehicle 1 goes by the crossing oncoming vehicle. The vehicle control unit 14 determines whether it is before the vehicle 1 goes by the crossing oncoming vehicle based on, for example, a recognition result of the crossing oncoming vehicle.

When it is determined that it is not before the vehicle 1 goes by the crossing oncoming vehicle (after the vehicle 1 goes by the crossing oncoming vehicle) (S14: NO), the autonomous driving ECU 10 proceeds to the processing of S13 described above and then ends the processing of FIG. 3.

On the other hand, when it is determined that it is before the vehicle 1 goes by the crossing oncoming vehicle (S14: YES), the autonomous driving ECU 10 proceeds to the processing of S15. In S15, the autonomous driving ECU 10 causes the vehicle control unit 14 to determine whether the crossing oncoming vehicle is a two-wheeled vehicle. The vehicle control unit 14 determines whether the crossing oncoming vehicle is a two-wheeled vehicle based on, for example, a recognition result of the crossing oncoming vehicle.

When it is determined that the crossing oncoming vehicle is not a two-wheeled vehicle (S15: NO), the autonomous driving ECU 10 proceeds to the processing of S16. In S16, the autonomous driving ECU 10 causes the vehicle 1 to travel with the acceleration or the vehicle speed limited to the second upper limit value with the vehicle control unit 14. For example, until the vehicle speed reaches the second vehicle speed upper limit value (second upper limit value), the vehicle control unit 14 sets the acceleration to be less than or equal to the second acceleration upper limit value (second upper limit value) and causes the vehicle 1 to travel. Thereafter, the autonomous driving ECU 10 ends the processing of FIG. 3.

On the other hand, when it is determined that the crossing oncoming vehicle is a two-wheeled vehicle (S15: YES), the autonomous driving ECU 10 proceeds to the processing of S17. In S17, the autonomous driving ECU 10 causes the vehicle 1 to travel with the acceleration or the vehicle speed limited to the third upper limit value with the vehicle control unit 14. For example, until the vehicle speed reaches the third vehicle speed upper limit value (third upper limit value), the vehicle control unit 14 sets the acceleration to be less than or equal to the third acceleration upper limit value (third upper limit value) and causes the vehicle 1 to travel. Thereafter, the autonomous driving ECU 10 ends the processing of FIG. 3.

When the vehicle 1 finishes passing through the intersection, the autonomous driving ECU 10 may end the processing of FIG. 3 in the middle.

As described above, when the traffic light is green and the state has changed from a state where the vehicle 1 cannot pass the intersection to a state where the vehicle 1 can pass the intersection at the intersection ahead of the host vehicle on the own lane, the autonomous driving ECU 10 causes the vehicle 1 that has stopped in front of the intersection to start moving. At this time, when there is a crossing oncoming vehicle that is about to turn right or left at the intersection in such a manner as to cross the own lane and the crossing oncoming vehicle is a two-wheeled vehicle, the vehicle 1 is caused to travel with the acceleration or the vehicle speed of the vehicle 1 limited to the third upper limit value smaller than the second upper limit value that is used when the crossing oncoming vehicle is not a two-wheeled vehicle. Specifically, until the vehicle speed reaches the third vehicle speed upper limit value (third upper limit value), the vehicle control unit 14 sets the acceleration to be less than or equal to the third acceleration upper limit value (third upper limit value) and causes the vehicle 1 to travel. As a result, when the crossing oncoming vehicle is a two-wheeled vehicle, the vehicle 1 travels at the intersection in further consideration of safety as compared to when the crossing oncoming vehicle is not a two-wheeled vehicle. Here, the two-wheeled vehicle as the crossing oncoming vehicle is lighter and more agile than, for example, a four-wheeled vehicle or the like, and tends to run into the own lane before going by the vehicle 1, rushing to turn right or left, for example. Thus, by limiting the acceleration of the vehicle 1 to the third upper limit value, the crossing oncoming vehicle can more easily recognize the vehicle 1 that starts moving. Alternatively, by limiting the vehicle speed of the vehicle 1 to the third upper limit value, the vehicle 1 can stop more easily. Therefore, when the traffic light is green and a vehicle that has stopped in front of an intersection is caused to start moving according to a traffic condition ahead of the vehicle, it is possible to cause the vehicle to travel at the intersection in further consideration of safety.

The vehicle control unit 14 causes the vehicle 1 to travel with the acceleration or the vehicle speed of the vehicle 1 limited to the second upper limit value or the third upper limit value until the vehicle 1 goes by the crossing oncoming vehicle, and causes the vehicle 1 to travel with the acceleration or the vehicle speed of the vehicle 1 limited to the first upper limit value after the vehicle 1 goes by the crossing oncoming vehicle. As a result, it is possible to smoothen traveling at an intersection after the vehicle 1 goes by the crossing oncoming vehicle while further considering safety until the vehicle 1 goes by the crossing oncoming vehicle.

Modification

Although various exemplary embodiments have been described above, various omissions, substitutions, and changes may be made without being limited to the above-described exemplary embodiments.

For example, in the above embodiment, after the vehicle 1 goes by the crossing oncoming vehicle, the vehicle 1 is caused to travel with the acceleration or the vehicle speed of the vehicle 1 limited to the first upper limit value, but the present disclosure is not limited to this configuration. For example, after the vehicle 1 goes by the crossing oncoming vehicle, the limit value may be gradually increased from the second upper limit value or the third upper limit value to the first upper limit value. Alternatively, the limitation may be lifted immediately after the vehicle 1 goes by the crossing oncoming vehicle.

In the above embodiment, when the vehicle 1 finishes passing through the intersection, the autonomous driving ECU 10 ends the processing of FIG. 3, but the present disclosure is not limited to this configuration. For example, the autonomous driving ECU 10 may end the processing of FIG. 3 when the vehicle 1 passes through a predetermined position (for example, an intermediate point) in the intersection.

In the above embodiment, the vehicle ahead located beyond the intersection ahead in the own lane is assumed to be stopped, but the vehicle ahead may be traveling at a low speed. The point is that the space recognition unit 12 recognizes the stoppable space between the vehicle ahead located beyond the intersection in the straight traveling direction and the intersection, and the passing determination unit 13 determines whether the vehicle 1 can pass through the intersection.

What is claimed is:

1. An autonomous driving vehicle comprising:

an electronic control unit (ECU); and an in-vehicle external sensor;

wherein the ECU is configured to:

recognize a lighting state of a traffic light at an intersection ahead of a host vehicle on an own lane based on a detection result of the in-vehicle external sensor;

recognize a space between a vehicle ahead located beyond the intersection in a straight traveling direction of the host vehicle and the intersection based on the detection result of the external sensor;

determine, based on the space, whether the host vehicle can pass through the intersection; and stop the host vehicle in front of the intersection when the lighting state is green lighting and the host vehicle cannot pass through the intersection, and wherein the ECU is configured to, when the lighting state is green lighting and a state has changed from a state where the host vehicle cannot pass the intersection to a state where the host vehicle can pass the intersection:

cause the host vehicle that has stopped in front of the intersection to start moving and cause the host vehicle to continue traveling through the intersection with an acceleration or a vehicle speed of the host vehicle limited to a second upper limit value smaller than a first upper limit value when there is a crossing oncoming vehicle that is about to turn right or left at the intersection in such a manner as to cross the own lane, the first upper limit value being used when there is no crossing oncoming vehicle; and cause the host vehicle to continue traveling through the intersection with the acceleration or the vehicle speed of the host vehicle limited to a third upper limit value smaller than the second upper limit value when the crossing oncoming vehicle is a two-wheeled vehicle, the second upper limit value being used when the crossing oncoming vehicle is not a two-wheeled vehicle, wherein the third upper limit value is greater than zero.

2. The autonomous driving vehicle according to claim 1, wherein the ECU is configured to: cause the host vehicle to continue traveling through the intersection with the acceleration or the vehicle speed of the host vehicle limited to the second upper limit value or the third upper limit value until the host vehicle goes by the crossing oncoming vehicle; and cause the host vehicle to continue traveling through the intersection with the acceleration or the vehicle speed of the host vehicle limited to the first upper limit value after the host vehicle goes by the crossing oncoming vehicle.

3. The autonomous driving vehicle according to claim 1, wherein the first upper limit value is a first vehicle speed upper limit value for the vehicle speed of the host vehicle, and wherein the ECU is configured to, until the vehicle speed reaches the first vehicle speed upper limit value, control the acceleration to be less than or equal to a first acceleration upper limit value and causes the vehicle to continue traveling through the intersection.

4. The autonomous driving vehicle according to claim 3, wherein the second upper limit value is a second vehicle speed upper limit value for the vehicle speed of the host vehicle, and wherein the ECU is configured to, until the vehicle speed reaches the second vehicle speed upper limit value, control the acceleration to be less than or equal to a second acceleration upper limit value and causes the vehicle to continue traveling through the intersection.

5. The autonomous driving vehicle according to claim 4, wherein the third upper limit value is a third vehicle speed upper limit value for the vehicle speed of the host vehicle, and wherein the ECU is configured to, until the vehicle speed reaches the third vehicle speed upper limit value, control the acceleration to be less than or equal to a third acceleration upper limit value and causes the vehicle 1 to continue traveling through the intersection.

* * * * *